(12) United States Patent
Kniel et al.

(10) Patent No.: US 12,341,409 B2
(45) Date of Patent: Jun. 24, 2025

(54) ELECTRIC ROTARY MACHINE AND DRIVE ARRANGEMENT

(71) Applicant: Schaeffler Technologies AG & Co. KG, Herzogenaurach (DE)

(72) Inventors: Jonas Kniel, Karlsruhe (DE); Patrick Gramann, Renchen (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 240 days.

(21) Appl. No.: 18/007,829

(22) PCT Filed: May 6, 2021

(86) PCT No.: PCT/DE2021/100411
§ 371 (c)(1),
(2) Date: Dec. 2, 2022

(87) PCT Pub. No.: WO2021/244700
PCT Pub. Date: Dec. 9, 2021

(65) Prior Publication Data
US 2023/0238859 A1 Jul. 27, 2023

(30) Foreign Application Priority Data

Jun. 2, 2020 (DE) .......................... 102020114604.3

(51) Int. Cl.
*H02K 9/19* (2006.01)
(52) U.S. Cl.
CPC ..................... *H02K 9/19* (2013.01)

(58) Field of Classification Search
CPC ................................. H02K 9/19; H02K 9/197
See application file for complete search history.

(56) References Cited

U.S. PATENT DOCUMENTS

| 8,348,727 B2* | 1/2013 | Trautner | ............... B24B 41/007 451/344 |
| 9,102,048 B2* | 8/2015 | Kuehne | ................... B25F 5/008 |

(Continued)

FOREIGN PATENT DOCUMENTS

| DE | 102007033457 | 2/2008 |
| DE | 102012022453 | 5/2014 |
| DE | 102015015797 | 8/2016 |

(Continued)

*Primary Examiner* — Naishadh N Desai
(74) *Attorney, Agent, or Firm* — Volpe Koenig

(57) ABSTRACT

An electric rotary machine and a drive arrangement for a motor vehicle. The electric rotary machine having a rotor that rotates about an axis of rotation, a stator, a fluid supply device arranged statically fixed and a distribution element fluidically connected to the fluid supply device and rotatable relative thereto. The fluid supply device has a flow channel with an outlet for discharging cooling fluid in an outlet direction, and an axis of rotation of the distribution element is arranged such that the outlet direction runs tangentially to a circumference of the distribution element so the cooling fluid exiting the outlet can flow tangentially against the distribution element which can be set in rotation based on the incident flow, so the cooling fluid can be distributed around the axis of rotation. Large-area cooling is achieved in a structurally simple manner.

17 Claims, 2 Drawing Sheets

(56) References Cited

U.S. PATENT DOCUMENTS

2012/0043836 A1* 2/2012 Creviston ................ H02K 9/19
                                                    310/54
2018/0069455 A1* 3/2018 Engblom ................. H02K 9/19

FOREIGN PATENT DOCUMENTS

| DE | 102016103408 | 9/2016 |
|----|--------------|--------|
| DE | 102017218351 | 4/2019 |
| EP | 3059837 | 8/2016 |
| JP | 2014030313 | 2/2014 |
| JP | 2016149900 | 8/2016 |
| WO | 2016132060 | 8/2016 |
| WO | 2019201376 | 10/2019 |

* cited by examiner

ELECTRIC ROTARY MACHINE AND DRIVE ARRANGEMENT

CROSS-REFERENCE TO RELATED APPLICATIONS

This application is the U.S. National Phase of PCT Appln. No. PCT/DE2021/100411, filed May 6, 2021, which claims the benefit of German Patent Appln. No. 10 2020 114 604.3, filed Jun. 2, 2020, the entire disclosures of which are incorporated by reference herein.

TECHNICAL FIELD

The disclosure relates to an electric rotary machine and a drive arrangement for a motor vehicle.

BACKGROUND

Various electric drive devices are known from the prior art, which are used in drive arrangements for motor vehicles.

Such electric drive devices usually comprise an electric rotary machine with a rotor which can be rotated about an axis of rotation and a stator which is arranged statically with respect to the rotor and a housing, in which the electric rotary machine is arranged or which is formed by the electric rotary machine, for enclosing the rotor. In this context, it is known to provide cooling of the stator and/or rotor of the electric rotary machine for the purpose of increasing efficiency.

DE 10 2015 015 797 A1 discloses an electric machine with a rotor and a stator. The stator comprises at least one winding which has at least one surface facing the rotor, which can be acted upon by a cooling liquid sprayed outward from the rotor in the radial direction by rotating the rotor for the purpose of cooling the winding.

EP 3 059 837 A1 describes a method for surface cooling of at least a part of an electric machine and a cooling device for carrying out the method. The cooling device is provided to form a high-pressure flow and a low-pressure flow in order to generate a coolant flow. For this purpose, the cooling device comprises a nozzle generating the high-pressure flow, wherein the high-pressure flow is designed to pass along a surface to be cooled of a rotor of the electric machine by means of the Coanda effect and to entrain a low-pressure flow according to the injection principle.

WO 2016 132 060 A1 describes an electric rotary machine having a stator with a stator body and a distribution circuit for receiving a cooling fluid for cooling the electric rotary machine. The distributor circuit is designed to conduct a cooling fluid into an interior space of the electric rotary machine in which the stator is located. For this purpose, the distributor circuit has exactly one opening facing a side surface of the stator body so that the cooling fluid can be fed directly to the stator body.

JP 2016 149 900 A discloses a cooling structure comprising an electric rotary machine, a circulation path, a fluid tank, a recirculation channel, and a valve device. The electric rotary machine comprises a rotor and a stator, wherein the rotor is arranged in a rotor chamber and the stator is arranged in a stator chamber and these two chambers are separated from one another in a fluid-tight manner by a partition wall. The circulation path connects the fluid tank to the stator chamber and the recirculation channel also connects the fluid tank to the stator chamber, wherein the valve device is designed to control the volume flow in the recirculation channel. The control action of the valve device, in this regard, depends on the fluid pressure prevailing in the stator chamber.

DE 10 2016 103 408 A1 discloses a stator of an electric motor comprising a stator core, a coil wound around teeth of the stator core, an outer cylinder surrounding the teeth at a yoke thereof, and a heat-conducting part in contact with an inner peripheral surface of the outer cylinder and a coil end of the coil.

This design allows some of the heat generated at the coils during operation of the motor to be conducted via the heat-conducting part to the outer cylinder and dissipated from the outer cylinder to the outside air. The coil of the motor is cooled accordingly via the heat-conducting part.

Particularly efficient cooling of the electric rotary machine is usually achieved by a fluid cooling. In most cases, oil is used as the cooling fluid, which is fed to the rotor and/or stator to dissipate heat there.

Typically, the oil is supplied to the rotor and/or stator for this purpose by one of two methods. Firstly, a distribution device can be connected to a rotating component and, upon rotation, use centrifugal force to fling the oil at the rotor and/or stator.

Alternatively, the distribution device is arranged on a stationary component in order to spray the oil from there to the rotor and/or the stator in the manner of a nozzle. However, if the distribution device is designed as a nozzle, only a specific section on the circumference of the rotor and/or stator is sprayed, so that several nozzles must be distributed around the circumference to ensure uniform cooling of the stator.

However, the centrifugal cooling only distributes the cooling oil or fluid fully as long as the fluid-carrying component is rotating. This means, however, that when the fluid-carrying component is stationary, the fluid is not distributed further, and cooling only occurs at certain points, such that overheating can occur locally at the uncooled points. Furthermore, the design of the fluid distribution in the rotating fluid-carrying component depending on the rotational speed and the prevailing fluid pressure is complex, in particular if several fluid output devices are provided which are fluidically connected to one another.

SUMMARY

On this basis, the present disclosure is based on the object of providing an electric rotary machine and a drive arrangement equipped therewith, which realize large-area cooling of the electric rotary machine in a structurally simple and cost-effective manner.

The object is achieved by the electric rotary machine having one or more of the features disclosed herein. Advantageous embodiments of the electric rotary machine are given below and in the claims. Supplementally provided is a drive arrangement for a motor vehicle, which comprises the electric rotary machine having one or more of the features disclosed herein.

The features described herein can be combined in any technically useful manner, wherein the explanations from the following description as well as features from the figures can also be consulted for this purpose, which comprise supplementary embodiments according to the disclosure.

In the context of the present disclosure, the terms "axial" and "radial" always refer to the axis of rotation of the distribution element.

The disclosure relates to an electric rotary machine having a rotor which can be rotated about an axis of rotation and having a stator arranged statically with respect to the rotor. The electric rotary machine further comprises at least one fluid supply device arranged in a statically fixed manner and a distribution element which is fluidically connected to the fluid supply device and can be rotated relative to the fluid supply device. The fluid supply device has a flow channel with an outlet for discharging a cooling fluid volume flow in an outlet direction. An axis of rotation of the distribution element is arranged in relation to the outlet such that the outlet direction runs tangentially to a circumference of the distribution element so that the cooling fluid volume flow exiting the outlet can flow tangentially against the distribution element and the distribution element can be set in rotation as a result of the incident flow, as a result of which the cooling fluid can be distributed around the axis of rotation of the distribution element, the cooling fluid being carried along by the distribution element.

In this way, the cooling fluid can be fed or distributed to at least one component of the electric rotary machine, in particular to windings or winding heads of the windings of the stator.

In particular, it is provided that the outlet extends substantially perpendicular to the axis of rotation of the rotor, and the axis of rotation of the distribution element extends parallel to the axis of rotation of the rotor.

The outlet and the distribution element can be arranged and configured such that the cooling fluid volume flow is directed to a partial circumference of the distribution element. This means that the vector of the cooling fluid volume flow does not act radially on the outside of the distribution element, but rather on the axial surface of the distribution element, however, still not radially with respect to the axis of rotation of the distribution element.

In an advantageous embodiment, the distribution element is a component that is substantially rotationally symmetrical about its axis of rotation.

In particular, the distribution element is a disc or a sleeve.

The distribution element can have at least one opening leading radially outward at its circumference. That is, in one embodiment of the distribution element, it is provided that an opening extends radially outward from a central axial passage of the distribution element to promote a centrifugal delivery of the cooling fluid. Furthermore, an edge or surface delimiting this opening serves as a carrier element in the tangential incident flow of the distribution element, so that it can be set in rotation not only by friction, but also by the hydrodynamic pressure acting on this edge or surface.

In particular, such an opening leading radially outward can be formed by a slot extending over the entire axial length in a distribution element designed as a disc or sleeve, or can also be formed as a bore in a distribution element designed as a sleeve.

Furthermore, the distribution element can comprise at least one carrier element which the cooling fluid volume flow can flow tangentially against and thus receives a tangentially acting force on the distribution element due to the effect of the hydrodynamic pressure of the cooling fluid. Such a carrier element can be the aforementioned edge or surface of the opening leading radially outward, or also another or further element which is arranged on an axial end face of the distribution element facing the outlet, or also an element which is arranged in a central axial passage of the distribution element and is acted upon there by the hydrodynamic pressure of the cooling fluid. A carrier element arranged in this position can be realized in particular as a groove formed in the distribution element and extending essentially parallel to the axis.

The fluid supply device can be arranged on or formed by the stator. Alternatively, the fluid supply device is arranged on or formed by a housing of the electric rotary machine.

In a further advantageous embodiment, it is provided that the flow channel is formed at least in sections by a longitudinal bore of a screw screwed into an element arranged in a statically fixed manner of the electric rotary machine, wherein the outlet is formed in a manner extending from the longitudinal bore in the screw. In particular, the flow channel extends parallel to the axis of rotation of the rotor. In this embodiment, the distribution element is located in the axial direction between the element arranged in a statically fixed manner and a screw head of the screw with its central axial passage on a shank of the screw, wherein there is sufficient axial clearance between the element arranged in a statically fixed manner and the distribution element on the one hand and the distribution element and the screw head on the other hand so that the distribution element can rotate around the shank of the screw.

Accordingly, the electric rotary machine is designed in such a way that a speed-independent and large-area cooling option for components of the electric rotary machine is realized, which is easy to design.

The fluid pressure alone is sufficient to ensure the distribution of the fluid.

Furthermore, according to the disclosure, a drive arrangement for a motor vehicle is provided which comprises an electric rotary machine according to the disclosure and an output device. The output device can in particular be a transmission, or an internal combustion engine.

The drive arrangement or the electric rotary machine itself comprises a flow generation device for generating the cooling fluid volume flow, which is fluidically coupled to the fluid supply device, wherein the flow generation device is designed in such a way that a sufficiently large cooling fluid volume flow can be generated at the outlet, which is capable of setting the distribution element in rotation. The rotation of the distribution element distributes the cooling fluid around the outlet of the fluid supply device.

In one embodiment of the electric rotary machine, it is provided that the electric rotary machine has several fluid supply devices and distribution elements assigned to them, in particular distributed on the stator, for the purpose of cooling windings or winding heads of the stator.

BRIEF DESCRIPTION OF THE DRAWINGS

The disclosure described above is explained in detail below against the relevant technical background with reference to the accompanying drawings, which show preferred embodiments. The disclosure is not limited in any way by the purely schematic drawings, wherein it should be noted that the embodiments shown in the drawings are not limited to the dimensions shown. In the drawings.

DETAILED DESCRIPTION

Figure 1:
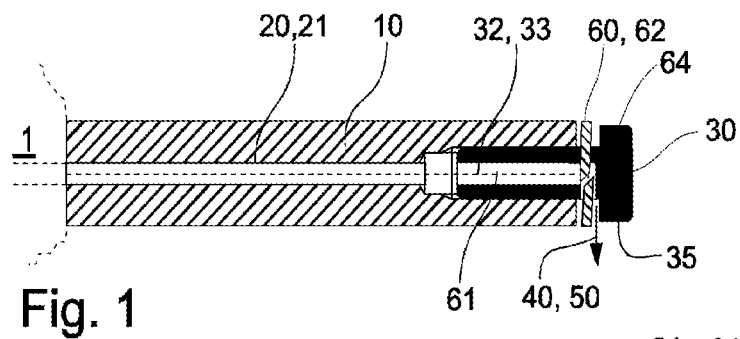
FIG. 1: shows a first embodiment of the fluid supply device with a distribution element arranged thereon in a sectional view.

In the figures, the fluid supply device 10 with a distribution element arranged thereon is shown in two different variants. First, reference is made to the elements common to the two embodiments for the purpose of explaining the disclosure.

The electric rotary machine comprises a fluid supply device 10 on an element arranged in a statically fixed manner 1, in this case the stator. This fluid supply device 10 forms a flow channel 20 through which a cooling fluid can flow in a volume flow. In the embodiments shown here, the element arranged in a statically fixed manner 1 itself forms a first section 21 of the flow channel 20. This first section 21 of the flow channel 20 comprises an internal thread 11, into which a screw 30 is screwed with a corresponding complementary external thread 31. The screw 30 has a longitudinal bore 32 forming a second section 33 of the flow channel 20. The longitudinal bore 32 opens into an outlet 34 through which the cooling fluid volume flow 40 can exit in an outlet direction 50.

Between the element arranged in a statically fixed manner 1 and a screw head 35 of the screw 30, a distribution element 60 is rotatably arranged about an axis of rotation 61 which, in the embodiments shown, corresponds to the longitudinal axis of the screw 30.

The hydrodynamic pressure of the cooling fluid volume flow 40 exiting the outlet 34 in the outlet direction 50 causes the distribution element 60 to rotate due to a tangential incident flow of the distribution element 60. Due to the centrifugal force thereby acting on the cooling fluid, cooling fluid adhering to the distribution element 60 is flung off the distribution element 60 and distributed around the fluid supply device 10. This, and especially in the case of multiple fluid supply devices 10 on or in the electric rotary machine, ensures large-area and intensive cooling of components of the electric rotary machine.

Figure 2:
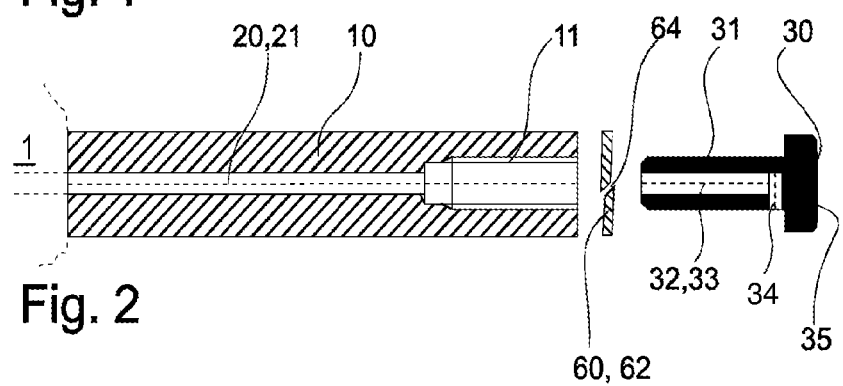
FIG. 2: shows the first embodiment of the fluid supply device with a distribution element arranged thereon in a sectional exploded view.
Figure 3:
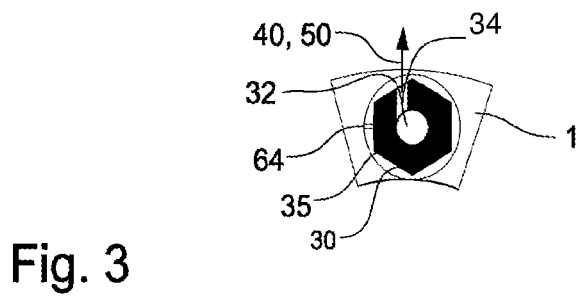
FIG. 3: shows the first embodiment of the fluid supply device with a distribution element arranged thereon in a frontal view
Figure 4:
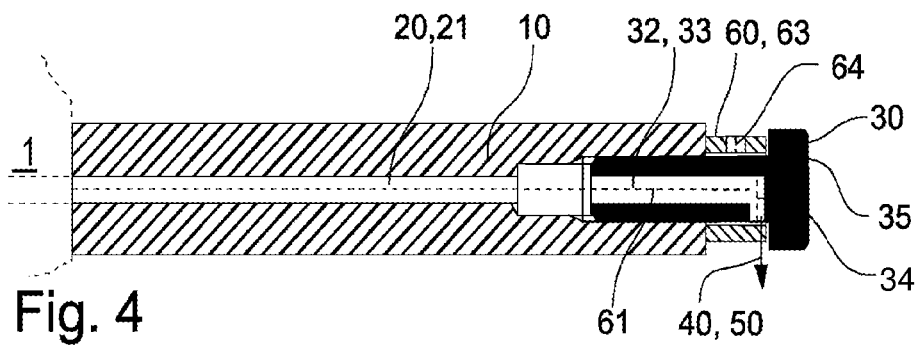
FIG. 4: shows a second embodiment of the fluid supply device with a distribution element arranged thereon in a sectional view.
Figure 5:
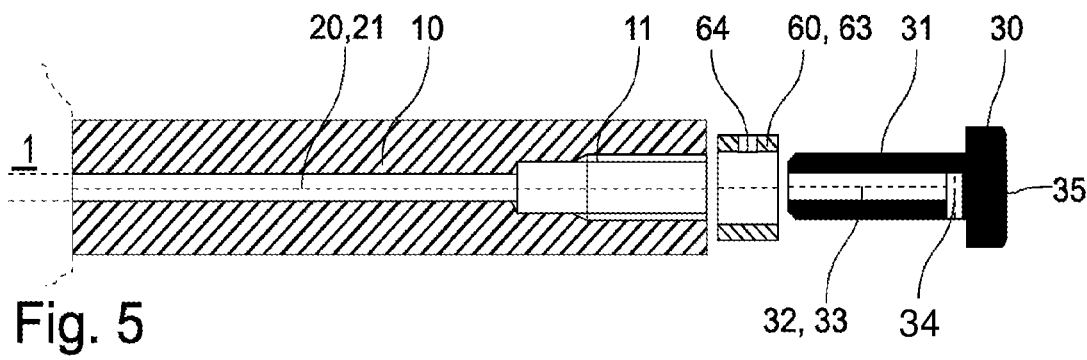
FIG. 5: shows the second embodiment of the fluid supply device with a distribution element arranged thereon in a sectional exploded view.
Figure 6:
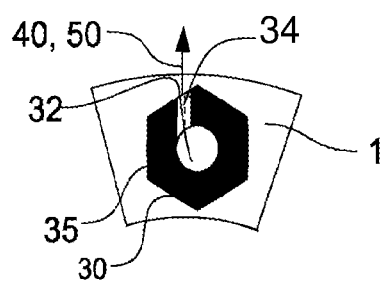
FIG. 6: shows the second embodiment of the fluid supply device with a distribution element arranged thereon in a frontal view
Figure 7:
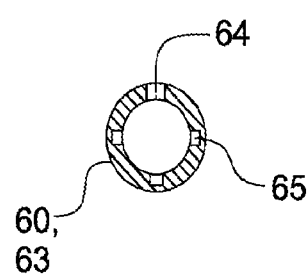
FIG. 7: shows individual parts of the second embodiment of the fluid supply device in a frontal view.
Figure 8:
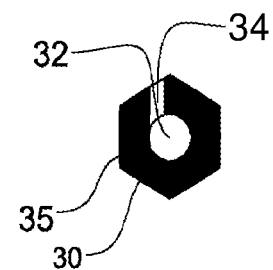
FIG. 8: shows individual parts of the second embodiment of the fluid supply device in a frontal view.

In this regard, the embodiment shown in FIGS. 1 to 3 differs from the embodiment shown in FIGS. 4 to 8 in that in the embodiment shown in FIGS. 1 to 3, the distribution element 60 is a disc, and the embodiment shown in FIGS. 4 to 8 is a sleeve 63.

Both the disc 62 and the sleeve 63 are formed as a substantially rotationally symmetrical part, which is seated with a central opening on the shank of the screw 30.

In the first embodiment shown here, the disc 62 has an opening 64 in the form of a radial slot that favors guiding the cooling fluid radially outward during the rotational movement of the disc 62.

In the second embodiment shown here, the sleeve 63 has an opening 64 in the form of a bore that also favors guiding the cooling fluid radially outward during the rotational movement of the sleeve 63.

The sleeve 63 also has a number of carrier elements 65 in the form of grooves distributed on the radially inner side to facilitate the rotational movement of the sleeve 63 when it is acted on by the hydrodynamic pressure of the cooling fluid.

The respective distribution element 60 is thereby rotatably mounted on the screw 30 with an axial clearance, so that the cooling fluid flowing tangentially against the distribution element 60 can be flung off the distribution element 60 on the side of the incident flow.

Large-area cooling of the electric rotary machine can be achieved in a structurally simple and cost-effective manner by the electric rotary machine according to the disclosure and a drive arrangement equipped with said electric rotary machine.

LIST OF REFERENCE SYMBOLS

1 Element arranged in a statically fixed manner
10 Fluid supply device
11 Internal thread
20 Flow channel
21 First section of the flow channel
30 Screw
31 External thread
32 Longitudinal bore
33 Second section of the flow channel
34 Outlet
35 Screw head
40 Cooling fluid volume flow
50 Outlet direction
60 Distribution element
61 Axis of rotation
62 Disc
63 Sleeve
64 Opening
65 Carrier element

The invention claimed is:

1. An electric rotary machine, comprising:
a rotor that is rotatable about an axis of rotation;
a stator arranged statically with respect to the rotor;
a fluid supply device arranged in a statically fixed manner;
a distribution element which is fluidically connected to the fluid supply device and is rotatable relative to the fluid supply device;
the fluid supply device has a flow channel with an outlet for discharging a cooling fluid volume flow in an outlet direction; and an axis of rotation of the distribution element is arranged in relation to the outlet such that the outlet direction extends tangentially to a circumference of the distribution element so that the cooling fluid volume flow exiting the outlet is tangentially flowable against the distribution element and the distribution element is settable in rotation as a result of the incident flow, as a result of which the cooling fluid is distributable around the axis of rotation of the distribution element, with the cooling fluid being carried along by the distribution element;
wherein the flow channel is formed at least in sections by a longitudinal bore of a screw screwed into an element arranged in a statically fixed manner of the electric rotary machine, and the outlet is formed extending from the longitudinal bore in the screw.

2. The electric rotary machine according to claim 1, wherein the outlet extends substantially perpendicular to the axis of rotation of the rotor, and the axis of rotation of the distribution element extends parallel to the axis of rotation of the rotor.

3. The electric rotary machine according to claim 1, wherein the outlet and the distribution element are arranged and configured such that the cooling fluid volume flow is directed to a partial circumference of the distribution element.

4. The electric rotary machine according to claim 1, wherein the distribution element is a component substantially rotationally symmetrical about its axis of rotation.

5. The electric rotary machine according to claim 4, wherein the distribution element comprises a disc or a sleeve.

6. The electric rotary machine according to claim 1, wherein the distribution element has at least one opening leading radially outward at a circumference thereof.

7. The electric rotary machine according to claim 1, wherein the distribution element has at least one carrier element against which the cooling fluid volume flow is tangentially flowable and thus receives a tangentially acting force on the distribution element due to a hydrodynamic pressure of the cooling fluid.

8. The electric rotary machine according to claim 1, wherein the fluid supply device i) is arranged on or formed by the stator, or ii) is arranged on or formed by a housing of the electric rotary machine.

9. A drive arrangement for a motor vehicle comprising the electric rotary machine according to claim 1, and an output device.

10. An electric rotary machine, comprising:
a rotor that is rotatable about an axis of rotation;
a stator arranged statically with respect to the rotor;
a fluid supply device with an outlet for discharging a cooling fluid volume flow in an outlet direction;
a distribution element which is fluidically connected to the fluid supply device and is rotatable relative to the fluid supply device; and
the distribution element is arranged in relation to the outlet such that the outlet direction extends tangentially to a circumference of the distribution element so that the cooling fluid volume flow exiting the outlet is tangentially flowable against the distribution element and the distribution element is settable in rotation as a result of the incident flow to rotatably distribute the cooling fluid;
wherein the flow channel is formed at least in sections by a longitudinal bore of a screw screwed into an element arranged in a statically fixed manner of the electric rotary machine, and the outlet is formed extending from the longitudinal bore in the screw.

11. The electric rotary machine according to claim 10, wherein the outlet extends substantially perpendicular to the axis of rotation of the rotor, and an axis of rotation of the distribution element extends parallel to the axis of rotation of the rotor.

12. The electric rotary machine according to claim 10, wherein the outlet and the distribution element are arranged and configured such that the cooling fluid volume flow is directed to a partial circumference of the distribution element.

13. The electric rotary machine according to claim 10, wherein the distribution element is a component substantially rotationally symmetrical about its axis of rotation.

14. The electric rotary machine according to claim 13, wherein the distribution element comprises a disc or a sleeve.

15. The electric rotary machine according to claim 10, wherein the distribution element has at least one opening extending radially outward at a circumference thereof.

16. The electric rotary machine according to claim 10, wherein the distribution element has at least one carrier element against which the cooling fluid volume flow is tangentially flowable to impart a tangentially acting force on the distribution element due to a hydrodynamic pressure of the cooling fluid.

17. The electric rotary machine according to claim 10, wherein the fluid supply device i) is arranged on or formed by the stator, or ii) is arranged on or formed by a housing of the electric rotary machine.

* * * * *